(12) United States Patent
Rittner et al.

(10) Patent No.: US 8,858,047 B2
(45) Date of Patent: Oct. 14, 2014

(54) PASSENGER LIGHT COOLING

(75) Inventors: Wolfgang Rittner, Ahrensbok (DE);
Ruediger Meckes, Berkenthin (DE);
Hasso Weinmann, Luebeck (DE);
Guenter Boomgaarden, Scharbeutz (DE)

(73) Assignee: Zodiac Aerotechnics, Plaisir (FR)

( * ) Notice: Subject to any disclaimer, the term of this patent is extended or adjusted under 35 U.S.C. 154(b) by 216 days.

(21) Appl. No.: 13/353,360

(22) Filed: Jan. 19, 2012

(65) Prior Publication Data

US 2012/0199694 A1 Aug. 9, 2012

Related U.S. Application Data

(60) Provisional application No. 61/439,155, filed on Feb. 3, 2011.

(51) Int. Cl.
*B60Q 1/00* (2006.01)
*B60Q 3/02* (2006.01)
*B64D 11/00* (2006.01)
*B64D 13/00* (2006.01)

(52) U.S. Cl.
CPC ........ B64D 11/00 (2013.01); *B64D 2011/0053* (2013.01); *B64D 2013/003* (2013.01); *Y02T 50/46* (2013.01)
USPC ............ 362/471; 362/480; 362/364; 362/523

(58) Field of Classification Search
CPC ................ B64D 2013/003; B64D 2011/0053; B64D 11/00; B64D 13/00; B60Q 3/0253
USPC ......................................... 362/470, 471, 480
See application file for complete search history.

(56) References Cited

U.S. PATENT DOCUMENTS 2,010,322 A * 8/1935 Riddell .......................... 454/293
2,526,828 A * 10/1950 Phillips .......................... 138/103

(Continued)

FOREIGN PATENT DOCUMENTS

| DE | 1219346 B | 6/1966 |
|----|-----------|--------|
| DE | 19847884 A1 | 4/2000 |
| DE | 202009005100 U1 | 11/2009 |
| KR | 20020023606 A * | 3/2002 |

OTHER PUBLICATIONS

Machine English translation of KR 20020023606 to Jeon.*

(Continued)

*Primary Examiner* — Sikha Roy
(74) *Attorney, Agent, or Firm* — Kilpatrick Townsend & Stockton LLP; Renae B. Wainwright, Esq.; Dean W. Russell, Esq.

(57) ABSTRACT

The invention relates to a passenger service unit for an aircraft, comprising at least one light source and at least one passenger air supply device. According to the invention the passenger air supply device is adapted for applying a flow of air to the light source. Furthermore it relates to a method for providing light and fresh air to passenger of an aircraft by providing an air flow from an air supply device and light from a light source to the passenger. The method comprises applying an air flow from said passenger air supply device to said light source for cooling the light source by means of convection. Furthermore the invention relates to a method for assembling a passenger service unit and to an aircraft.

17 Claims, 2 Drawing Sheets

(56) References Cited

U.S. PATENT DOCUMENTS

| | | | |
|---|---|---|---|
| 4,142,227 A | 2/1979 | Aikens | |
| 5,404,297 A * | 4/1995 | Birk et al. | 362/421 |
| 5,651,733 A * | 7/1997 | Schumacher | 454/76 |
| 5,921,670 A * | 7/1999 | Schumacher et al. | 362/480 |
| 2007/0139941 A1 * | 6/2007 | Bryan et al. | 362/470 |
| 2008/0112155 A1 | 5/2008 | Scown et al. | |
| 2010/0093267 A1 * | 4/2010 | Hogh et al. | 454/76 |
| 2012/0230530 A1 * | 9/2012 | Schevardo | 381/333 |

OTHER PUBLICATIONS

European Search Report dated Jul. 12, 2011 in related Application No. EP11153237.

* cited by examiner

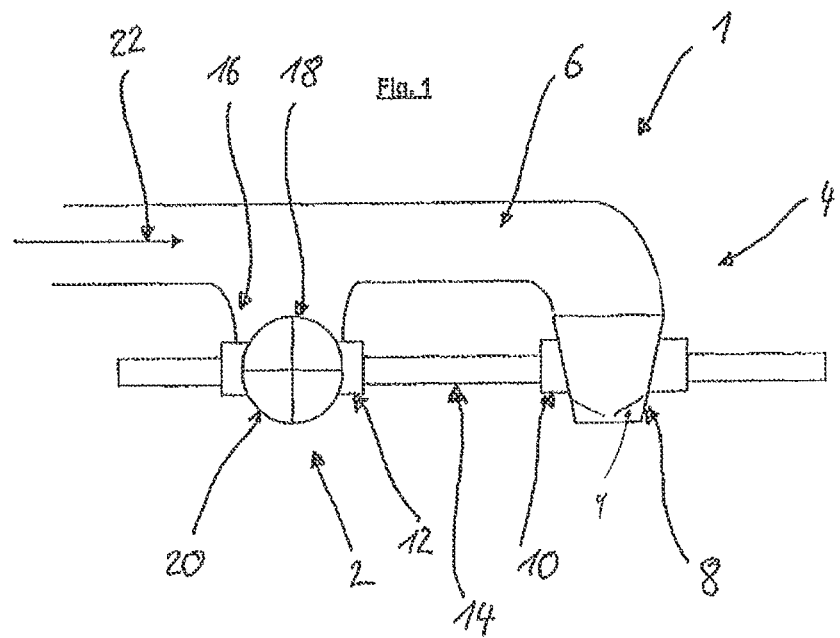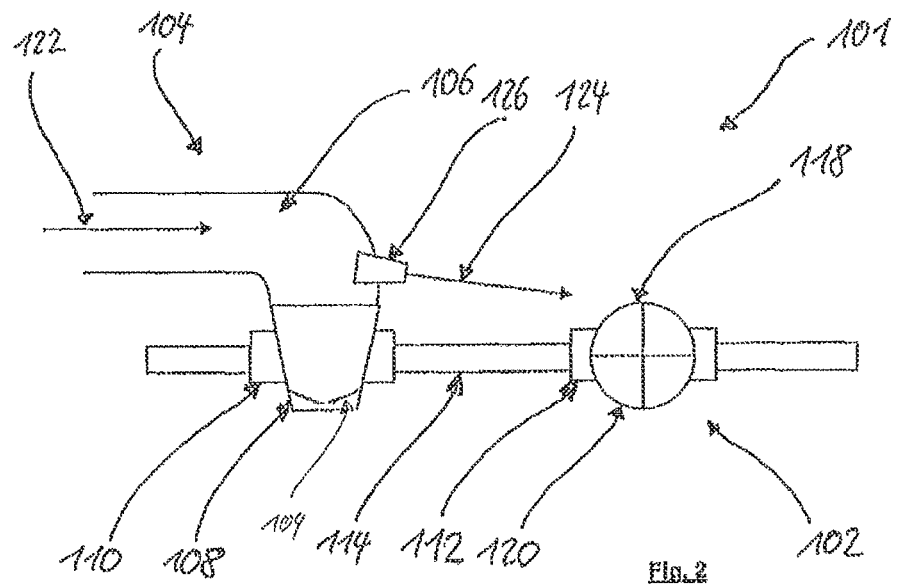

PASSENGER LIGHT COOLING

CROSS-REFERENCE TO RELATED APPLICATION

This application claims priority to U.S. Provisional Application No. 61/439,155 filed on Feb. 2, 2011, the contents of which are incorporated herein by reference.

FIELD OF THE INVENTION

The invention relates to a passenger service unit for an aircraft, comprising at least one light source and at least one passenger air supply device. Furthermore the invention relates to a method for providing light and fresh air to passenger of an aircraft. A further aspect of the invention is a method for assembling a passenger service unit. Furthermore the invention relates to an aircraft comprising at least one passenger service unit.

BACKGROUND OF THE INVENTION

Passenger service units of the aforementioned type are known in the state of the art and widely used in civil aircrafts. Generally these passenger service units comprise a passenger light, a passenger air supply device, oxygen masks, warning lights and the like. In some aircrafts one passenger service unit is provided for each seat of passenger and crew member, in other aircrafts one passenger service unit is provided for a couple of seats. Modern civil aircrafts may transfer a number of passengers ranging from about 50 to several hundred of passengers. Since one aircraft may comprise a high number of passenger service units, maintenance of these service units is very time-consuming. This leads to high maintenance costs, especially since the aircraft is on ground during maintenance.

SUMMARY OF THE INVENTION

The invention aims to provide a passenger service unit for an aircraft which overcomes at least one of the aforementioned drawbacks, in particular the invention aims to provide a passenger service unit which reduces maintenance costs and maintenance time.

According to the first aspect of the invention this object is achieved by providing a passenger service unit for an aircraft, as described beforehand comprising at least one light source and at least one passenger air supply device, characterized in that the passenger air supply device is adapted for applying a flow of air to the light source. According to this aspect of the invention the light source is being cooled by a flow of air from the passenger air supply device leading to an increased lifetime of the light source. By increasing the lifetime the light source may be less frequently replaced or repaired, leading to a significantly reduced maintenance time during an aircraft on ground case. According to this embodiment the light source may comprise a light bulb or a LED. Furthermore the light source may comprise any other possible light source like a halogen lamp or an OLED. The passenger air supply device according to this embodiment maybe a standard air-condition outlet of the aircraft or any other passenger air supply device.

As a further advantage of this invention the over all weight is reduced since no additional heat sinks or dissipater are needed for dissipating the heat emitted by the light source.

According to a preferred embodiment of the passenger service unit, the passenger air supply device comprises an air duct with an outlet for directing an airflow to a passenger and the light source is at least partially integrated into the air duct. Integrating the light source at least partially into the air duct is a simple way to apply a flow of air to the light source. Preferably the light source is integrated into the air duct in the direction of the flow before the outlet. The light source may be integrated in such a way, that a first part of the light source, for example the part comprising the electrical connection, is integrated into the air duct, and a second part of the light source, for example the part comprising a light radiation part, is integrated into a surface part of a passenger service unit, so that a passenger is provided with light from the light source. The surface part of the passenger service unit may be a part or a wall of the air duct. In an alternative embodiment the air duct is arranged closely to the surface part of the passenger service unit, so that the light source may be integrated at least partially into the air duct and the passenger may be provided with the light from the light source. In a further alternative embodiment the air duct may comprise an extension extending in the direction of the surface part, so that the light source may be at least partially integrated into the extension of the air duct and the passenger may be provided with light from the light source. These aspects of the invention lead to the further advantage of a reduction of the dimension of the passenger service unit. Also the weight of the passenger service unit may be reduced, hence leading to an overall weight reduction of the aircraft.

According to a further preferred embodiment of the passenger service unit, the passenger air supply device comprises an air duct with a first outlet for directing a first airflow to a passenger and second outlet, in particular a nozzle, for directing a second airflow to the light source. According to this aspect of the invention, the original layout of a standard passenger service unit for an aircraft may remain, a second outlet, in particular a nozzle, is arranged at the air duct for directing a second airflow to the light source. This outlet may be kept small, so that the airflow directed to the light source may be also kept small, which only leads to a slightly increased over all airflow. In an alternative embodiment the air duct may also comprise a third, fourth, and so on outlet, in particular a nozzle, for directing an airflow to a second, third, and so on light source. According to this aspect of the invention, a nozzle refers to an arrangement of the second outlet adapted for directing an airflow to the light source. The second outlet and/or the nozzle may also comprise an orifice, a tip, a jet, a dye and the like.

According to a further preferred embodiment of the passenger service unit, the light source is ranged in an outlet of an air duct of the passenger air supply device. Arranging the light source in an outlet of an air duct of the passenger air supply device is another simple possibility to apply a flow of air to the light source. According to this embodiment the light source may be arranged in such a way, that the airflow provided to the passenger and the light radiation provided to the passenger are substantially in a coaxial manner. The light source may be held by a frame device directly in front of the opening, hence not inside the air duct but in the outlet. In an alternative embodiment the light source is at least partially arranged inside the air duct. In a further alternative embodiment the light source is completely arranged inside the air duct and held by a frame device. All embodiments according to this aspect of the invention lead to the further advantage of a reduction of the dimension of the passenger service unit.

According to a further preferred embodiment of the passenger service unit, the outlet comprises an orifice mounted in a first mounting component and being movable with regard to this first mounting component for directing the flow of air exiting the orifice into at least two, preferably a plurality of alternative directions and the light source is mounted in a second mounting component and being movable with regard to this second mounting component for directing the light beam into at least two, preferably a plurality of alternative directions and preferably the second mounting component being movable with regard to the first mounting component. According to this aspect of the invention, the direction of the air provided to the passenger may be adjusted, in particular by the passenger. Furthermore the direction of the light radiation may be adjusted, in particular by the passenger. Preferably the direction of the air flow provided to the passenger and the radiation of the light may be adjusted independently from each other. The light source may comprise an aperture for also adjusting the intensity of light radiation. In case the light source is arranged in the outlet of the air duct, it may be arranged in the orifice of the air duct. In this case preferably the light source is arranged not in a coaxial manner with the orifice, so that the angle between the light radiation and the airflow direction may easily be adjusted and also the light source is being applied with a flow of air from the passenger air supply device.

According to a further preferred embodiment of the passenger service unit, the outlet and/or the orifice is closable by means of closing means. By arranging closing means at the outlet and/or the orifice, the outlet and the orifice respectively may be closed totally, so that no airflow is provided to the passenger. Furthermore the closing means may be arranged in such a way that the intensity of the airflow provided to the passenger may be adjusted. Closing means in this context refers to apertures, visors, shields, shutters, valves, closable nozzles, closable orifices and the like.

According to a further preferred embodiment of the passenger service unit, the light source is arranged upstream of the closing means and the orifice and/or the closing means are at least partially transparent. By arranging the light source upstream of the orifice inside the air duct, the dimensions of the passenger service unit are reduced. Furthermore only one outlet for light and air is needed inside a surface part of the passenger service unit. In case of this arrangement it is preferred that closing means, like mentioned above, and/or the orifice are at least partially transparent, so that light may be provided to the passenger even in the case the outlet of the passenger air supply device is closed by said closing means.

According to a further preferred embodiment of the passenger service unit, the light source receiving an airflow in case the closing means are in a closed position, in that the closing means cannot be fully closed, and/or a bypass duct for directing an airflow to the light source is present. It is preferred that the light source receives a substantially constant flow of air, even if the closing means are in a closed position, so that the passenger is not provided with a flow of air. In one embodiment the closing means cannot be fully closed, so that at least a small flow of air is provided into the passenger cabin, but not necessarily directed to the passenger. In an alternative or additional embodiment a bypass duct for directing an airflow to the light source is present. This bypass duct may be opened in case the closing means are closed. This may result from a mechanical coupling of the closing means and the opening means of the bypass duct. It may also result from a change in pressure in the duct of the passenger air supply device, or from any other suitable device. The bypass duct also may be connected to an adjacent passenger service unit, thus providing an extra airflow to the adjacent passenger service unit. The bypass duct may also be directed to the environment of the passenger service unit.

According to a further preferred embodiment of the passenger service unit the light source is mounted in a sidewall of the air duct and extending into the air duct according to this embodiment the light source is presented by a steady air flow of the passenger air supply device. This embodiment is also suitable for larger light sources.

According to another preferred embodiment of the passenger service unit the light source is mounted in a frame element inside the air duct. Mounting the light source in a frame element makes it possible to place the light source in a desired place in the air duct. Furthermore the frame element may be adapted to be movable with respect to the air duct, so that the direction of radiation of the light source may be adjusted. Another advantage of the frame element is, that maintenance of the light source may be easier taken out, especially replacement of the light source.

According to another aspect of the invention the object is achieved by a method for providing light and fresh air to passenger of an aircraft by providing an airflow from an air supply device and light from a light source to the passenger, by applying an airflow from said passenger air supply device to said light source for cooling the light source by means of convection. According to this method fresh air and light are provided to the passenger and the light source is being cooled by the airflow applied from the passenger air supply device to the light source, so that the lifetime of the light source is being increased. This leads to a reduction in maintenance time and maintenance costs. Furthermore it leads to at least one of the aforementioned advantages.

According to another aspect of the invention the object is achieved by a method for assembling a passenger service unit, by attaching a nozzle to an air duct of a passenger air supply device, so that the nozzle is in fluid communication with the air duct to direct an airflow to a light source. According to an alternative embodiment of this method to one air duct of one passenger air supply device at least two, preferably a plurality of nozzles are attached, so that the plurality of the nozzles are in fluid communication with the air duct to direct an airflow to at least two, preferably a plurality of light sources. By attaching at least one nozzle to an air duct of a passenger air supply device the light source is being provided with an airflow, which leads to an increased lifetime of the light source, hence leading to a reduction in maintenance time and maintenance costs. A further advantage of this method is the subsequent attachment of nozzles to existing standard passenger service units which comprise a passenger air supply device and a light source. Nozzle in this case refers not only to literal nozzles, but also to holes, outlets, orifices, valves, and the like. In an alternative embodiment of the method a hole is arranged in an air duct of a passenger air supply device, so that an airflow passes out of the hole and is directed to a light source. The hole may be drilled, or cut, or the like.

According to another aspect of the invention the object is achieved by a method for assembling a passenger service unit by mounting a light source at least partially into a passenger air duct of a passenger service unit and/or attaching a bypass to the air duct for providing an airflow to the light source. By mounting a light source at least partially into an air duct of a passenger service unit and/or attaching a bypass to the air duct for the light source is being provided with an airflow, which leads to a cooling of the light source, hence leading to an increased lifetime of the light source. This leads to a reduction in maintenance time and maintenance costs. Furthermore this method leads to the advantage of reduction in the dimension of a passenger service unit, since the light source is integrated at least partially into an air duct or a bypass. The light source may be integrated in such a way, that one part of the light source is extending into the air duct, and a second part of the light source, in particular the part which radiates the light, extends at least partially into a surface of the passenger service unit, so that a passenger is provided with light from the light source. In an alternative embodiment at least two, preferably a plurality of light sources are mounted into one air duct. Furthermore attaching a bypass has the advantage, that a substantially steady airflow may be provided to the light source even if one outlet of the passenger air supply device and/or the air duct is closed. Furthermore the light source may be integrated into a bypass, which connects at least one air duct or a plurality of air ducts with each other.

According to a preferred embodiment of one of the above mentioned methods the passenger air supply device and the light source are designed according to one of the aforementioned preferred embodiments of a passenger service unit. According to this aspect of the invention the advantages of the aforementioned embodiments of a passenger service unit and the advantages of the aforementioned methods may be realized, which is preferable.

According to another aspect of the invention the object is achieved by an aircraft comprising at least one passenger service unit according to one of the aforementioned embodiments of a passenger service unit. In particular in large aircrafts, for example for several hundreds of passengers, the aforementioned advantages are significant. It is preferred that an aircraft according to this aspect of the invention all passenger service units are formed according to one of the aforementioned preferred embodiments of a passenger service unit.

BRIEF DESCRIPTION OF THE DRAWINGS

Preferred embodiments of the invention is described with reference to the Figures wherein FIG. 1 is a schematical view of a passenger service unit according to a first embodiment of the invention, FIG. 2 is a schematical view of a passenger service unit according to a second embodiment of the invention.

DETAILED DESCRIPTION

Figure 3:
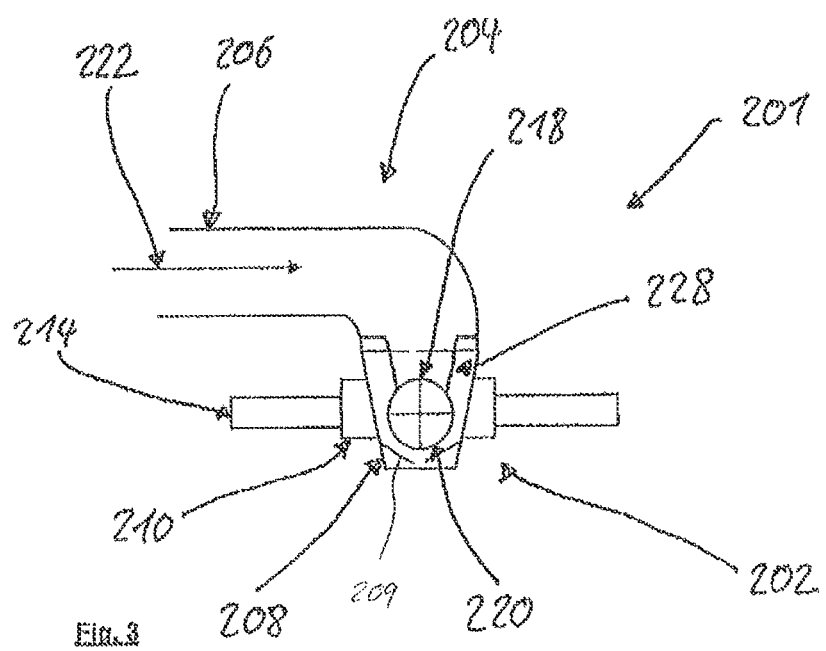
FIG. 3 is a schematical view of a passenger service unit according to a third embodiment of the invention.

Referring to FIG. 1, a passenger service unit 1 according to a first embodiment of the invention comprises one passenger air supply device 4 and one light source 2. Furthermore the passenger air supply device 4 comprises an air duct 6 which is arranged above a roof element 14 of a passenger cabin of an aircraft. One end of the air duct 6 is connected to an orifice 8, which is movably mounted in the roof element 14 by a first mounting component 10. On the other end the air duct 6 may be connected to a central passenger air supply like an air conditioning system of the aircraft or the like. This system supplies a flow of air 22 to the air duct 6.

According to this first embodiment the air duct 6 comprises an extension 16 which connects the air duct to an opening in the roof element 14. Into this opening the light source 2 is mounted by a second mounting element 12. The light source 2 is mounted in such a way, that a first part 18 of the light source 2 extends into the extension 16, and a second part 20 of the light source 2 extends away from the roof element 14 of the passenger cabin into the passenger cabin, so that a passenger may be provided with light from the light source 2. Additionally the orifice 8 may comprise closing means, so that the flow of air 22 may be adjusted by the passenger. According to this embodiment the flow of air 22 is stopped, if the closing means 9 of the orifice 8 are in a closed position. If the orifice 8 is in an open position, air flows through the air duct 6 and wafts along the first portion 18 of the light source 2, so that the light source 2 being cooled by means of convection.

In an alternative embodiment, the air duct 6 comprises a bypass, so that the air flow 22 is not stopped, in case the orifice 8 is closed. Such a bypass may just lead to the environment of the passenger service unit 1, or may connect the air duct 6 with an air duct of an adjacent passenger service unit. In a further alternative embodiment the extension 16 is not arranged at the air duct 6 but at a bypass connecting the air duct 6 with air ducts of adjacent passenger service units.

Referring to FIG. 2, a passenger service unit 101 according to a second embodiment of the invention comprises one light source 102 and one passenger air supply device 104. The passenger air supply device 104 further comprises an air duct 106 which is connected to an orifice 108 and comprises a nozzle 126. The orifice 108 is mounted into a roof element 114 of the passenger cabin which is also a surface element of the passenger service unit 101. The mounting element 110 for mounting the orifice 108 to the roof element 114 is adapted for mounting the orifice 108 in a movable manner to the roof element 114. Adjacent to the orifice 108 the light source 102 is mounted in the roof element 114 by a second mounting element 112. The light source 102 may also be mounted in a movable manner, so that the direction of radiation or the light beam may be adjusted by the passenger.

A first portion 118 of the light source 102 extends above the roof element 114, a second portion 120 of the light source 102 extends at least partially to the passenger cabin, to provide a passenger with light. The nozzle 126 is arranged at the air duct, in such a way that the nozzle 126 is in fluid communication with the air duct 106. By this nozzle 126 a directed airflow is provided to the first portion 118 of the light source 102 for cooling the light source 102 by means of convection. The nozzle 126 may be movably arranged at the air duct 106. It is also not limited to a nozzle it may also be just a hole, an orifice, a valve or the like. Anything feasible for applying a directed stream of air to the light source 102 would be possible.

In an alternative embodiment of the invention the orifice 108 is closable by closing means 109. According to this embodiment the airflow 122 would not be stopped if the closing means 109 of the orifice 108 are closed, since the airflow 122 may escape through the nozzle 126 as the airflow 124 indicates. So the light source 102 may be cooled by the airflow 124 even if the closing means 109 of the orifice 108 are in a closed position.

For assembling this passenger service unit, a hole may be drilled, or cut, or the like into the air duct 106. To this hole a nozzle 126 may be attached, so that the nozzle 126 is in fluid communication with the air duct 106, so that an airflow 124 may be directed to the light source 102. This method in particular is applicable to standard passenger service units of the state of the art. The nozzle may be arranged afterwards, so that a light source may be cooled by an airflow 124.

Referring to FIG. 3, a passenger service unit 201 according to a third embodiment of the invention comprises a light source 202 and a passenger air supply device 204. Furthermore it comprises an air duct 206 which is on one end connected to an orifice 208. The orifice 208 is mounted by a mounting element 210 to a roof element 214 of the passenger cabin. The roof element 214 may also be a surface element of the passenger service unit 201. The orifice 208 may be movable with respect to the mounting element 210. According to this embodiment, the light source 202 is arranged in the air duct 206, in particular in the orifice 208. It is held in place by a frame 228 which is connected to an inner portion of the air duct 206. The light source 202 may also be movable with respect to the frame and/or the air duct 206. According to this embodiment of the invention the whole light source 202, hence the upper portion 218 and the lower portion 220 are provided with an airflow 222, in contrast to the other embodiments of FIG. 1 and FIG. 2 where only the upper portion 18, 118 are provided with an airflow 22, 124. According to the embodiment shown in FIG. 3 it is preferred that the orifice 208 is at least partially transparent. By forming the orifice 208 out of a transparent material, the passenger may be provided with better light conditions. In an alternative or additional embodiment, the orifice 208 may comprise closing means for adjusting the airflow 222 by the passenger. It is also preferred that these closing means are formed out of a transparent material. Furthermore the passenger service unit 201, in particular the passenger air supply device 204 may comprise a bypass, so that the airflow 222 is not stopped in case the closing means 209 of the orifice 208 are in a closed position. In an alternative embodiment the closing means 209 may not be closed totally, so that the airflow 222 is not stopped. It is also preferred that the mounting element 210 allows the orifice 208 an independent moving with respect to the light source 202 which is also arranged movable by the frame 228. This makes it possible that a passenger may direct the airflow 222 for example to his head, and the light radiation or the light beam of the light source 202 for example to a book or a newspaper.

The invention claimed is:

1. A passenger service unit for an aircraft, comprising at least one light source and at least one passenger air supply device, wherein the passenger air supply device is adapted for applying a flow of air to the light source, wherein a direction of the air flow provided to at least one passenger and a direction of a radiation of light from the light source may be adjusted independently from each other, and
wherein the passenger air supply device comprises an air duct with an outlet for directing the air flow to the at least one passenger and the light source is at least partially integrated into the air duct.

2. The passenger service unit according claim 1, wherein the light source is arranged in an outlet of an air duct of the passenger air supply device.

3. The passenger service unit according to claim 1 wherein the outlet comprises an orifice mounted in a first mounting component and being movable with regard to this first mounting component for directing the flow of air exiting the orifice into at least two, preferably a plurality of alternative directions and that the light source is mounted in a second mounting component and being movable with regard to this second mounting component for directing the light beam into at least two, preferably a plurality of alternative directions and preferably the second mounting component being movable with regard to the first mounting component.

4. The passenger service unit according to claim 3, wherein the orifice is closable by means of closing means.

5. The passenger service unit according to claim 4, wherein the light source is arranged upstream of the closing means and at least one of the orifice and the closing means is at least partially transparent.

6. The passenger service unit according to claim 5, wherein the light source receiving an air flow in case the closing means are in a closed position in that:
the closing means cannot be fully closed, and/or
a bypass duct for directing an air flow to the light source is present.

7. The passenger service unit according to claim 1, wherein the outlet is closable by means of closing means.

8. The passenger service unit according to claim 1, wherein the light source is mounted in a frame element inside the air duct.

9. An aircraft comprising at least one passenger service unit according to claim 1.

10. A passenger service unit for an aircraft comprising at least one light source and at least one passenger air supply device, wherein:
the passenger air supply device is adapted for applying a flow of air to the light source, wherein a direction of the air flow and a direction of a radiation of light from the light source may be adjusted independently from each other, and
the passenger air supply device comprises an air duct with a first outlet for directing a first air flow to a passenger and a second outlet comprising a nozzle for directing a second air flow to the light source.

11. The passenger service unit according to claim 10, wherein the light source is arranged in an outlet of an air duct of the passenger air supply device.

12. The passenger service unit according to claim 10, wherein the outlet is closable by means of closing means.

13. The passenger service unit according to claim 12, wherein the orifice is closable by the closing means.

14. The passenger service unit according to claim 12, wherein the light source is arranged upstream of the closing means and at least one of the orifice and the closing means is at least partially transparent.

15. The passenger service unit according to claim 14, wherein the light source receiving an air flow in case the closing means are in a closed position in that:
the closing means cannot be fully closed, and/or
a bypass duct for directing an air flow to the light source is present.

16. The passenger service unit according to claim 10, wherein the light source is mounted in a side wall of the air duct and extending into the air duct.

17. An aircraft comprising at least one passenger service unit according to claim 10.

* * * * *